(12) United States Patent
Jepsen et al.

(10) Patent No.: US 10,928,074 B2
(45) Date of Patent: Feb. 23, 2021

(54) TECHNOLOGIES FOR UNDERFLOOR FLUID CONDUCTION

(71) Applicant: Scandic Builders, Inc., Basking Ridge, NJ (US)

(72) Inventors: Mads Jepsen, Green Village, NJ (US); Kimo Jepsen, Morristown, NJ (US)

(73) Assignee: Scandic Builders, Inc., Basking Ride, NJ (US)

( * ) Notice: Subject to any disclaimer, the term of this patent is extended or adjusted under 35 U.S.C. 154(b) by 0 days.

(21) Appl. No.: 16/017,101

(22) Filed: Jun. 25, 2018

(65) Prior Publication Data

US 2018/0306450 A1    Oct. 25, 2018

Related U.S. Application Data

(62) Division of application No. 15/727,008, filed on Oct. 6, 2017, now Pat. No. 10,006,643.

(60) Provisional application No. 62/485,504, filed on Apr. 14, 2017.

(51) Int. Cl.
*F24F 3/00*    (2006.01)
*F24D 3/14*    (2006.01)

(52) U.S. Cl.
CPC ............. *F24D 3/142* (2013.01); *F24D 3/148* (2013.01); *Y02B 30/00* (2013.01)

(58) Field of Classification Search
CPC . F24D 3/14; F24D 3/142; F24D 3/148; F24D 13/024; F24D 3/122; B62D 1/195; H05B 3/146
USPC .......................................................... 165/50
See application file for complete search history.

(56) References Cited

U.S. PATENT DOCUMENTS

| | | | |
|---|---|---|---|
| 1,800,150 A | * | 4/1931 | Musgrave ............. F25D 23/061 165/56 |
| 3,384,158 A | | 5/1968 | Rothenbach |
| 5,454,428 A | | 10/1995 | Pickard |
| 5,743,330 A | | 4/1998 | Bilotta |
| 5,862,854 A | | 1/1999 | Gary |
| 5,957,378 A | | 9/1999 | Fiedrich |

(Continued)

FOREIGN PATENT DOCUMENTS

| | | |
|---|---|---|
| CN | 202813568 | 3/2013 |
| CN | 202813569 | 3/2013 |

(Continued)

OTHER PUBLICATIONS

CN202813568U, Published Mar. 20. 2013, Machine Translation (4 pages).

(Continued)

*Primary Examiner* — Davis D Hwu
(74) *Attorney, Agent, or Firm* — Dentons US LLP

(57) ABSTRACT

A technology includes a first plate including a first pair of legs defining a first channel; a second plate including a second pair of legs defining a second channel; a first block supporting the first plate and the second plate such that the first block is positioned between the first channel and the second channel; a second block including a U-shaped trench with a first open end portion and a second open end portion, wherein the first open end portion leads to the first channel, wherein the second open end portion leads to the second channel; a tube extending within the U-shaped trench; and a U-shaped cover covering the U-shaped trench.

27 Claims, 16 Drawing Sheets

(56) References Cited

U.S. PATENT DOCUMENTS

| | | | |
|---|---|---|---|
| 6,009,612 | A | 1/2000 | Fiedrich |
| 6,079,182 | A | 6/2000 | Ellenberger |
| 6,152,377 | A | 11/2000 | Fiedrich |
| 6,170,567 | B1 | 1/2001 | Nakada |
| 6,283,382 | B1 | 9/2001 | Fitzemeyer |
| 8,176,694 | B2 * | 5/2012 | Batori ............... E04F 15/18 52/220.2 |
| 8,288,689 | B1 * | 10/2012 | Adelman ............... H05B 3/146 219/200 |
| 2003/0155100 | A1 * | 8/2003 | Montague, Jr. ......... F24D 19/04 165/53 |
| 2004/0040693 | A1 * | 3/2004 | Fiedrich ............... F24D 3/14 165/56 |
| 2004/0074631 | A1 | 4/2004 | Jeon |
| 2006/0249281 | A1 | 11/2006 | Park |
| 2008/0224459 | A1 * | 9/2008 | Oh ..................... B62D 1/195 280/777 |
| 2009/0101306 | A1 | 4/2009 | Reis |
| 2013/0244077 | A1 | 9/2013 | Palanchon |
| 2014/0196867 | A1 | 7/2014 | Tarraga Sanchez |
| 2014/0367477 | A1 | 12/2014 | Cha |

FOREIGN PATENT DOCUMENTS

| | | |
|---|---|---|
| CN | 205153456 | 4/2016 |
| DE | 3411339 | 10/1985 |
| EP | 0733866 | 9/1996 |
| KR | 20110127872 | 11/2011 |
| KR | 101386923 | 4/2014 |
| WO | WO2004057241 | 7/2004 |
| WO | WO 2010052259 | 5/2010 |
| WO | WO 2011139964 | 11/2011 |

OTHER PUBLICATIONS

CN202813569U, Published Mar. 20, 2013, Machine Translation (4 pages).
CN205153456U, Published Apr. 13, 2016, Machine Translation (5 pages).
EP0733866A2, Published Sep. 25, 1996, Machine Translation (13 pages).
WO2004057241A1, Published Jul. 8, 2004, Machine Translation (7 pages).
WO2010052259A2, Published May 14, 2010, Machine Translation (13 pages).
Under floor PEX radiant heat "how to install" examples, http://www.houseneeds.com/learning-center/pex-tubing-radiant-floor-heating/pex-tubing-under-floor-radiant-heating-install-diary, downloaded from the Internet on Aug. 16, 2016 (6 pages).
Under floor heating system for suspended floors http://help.tradingdepot.co.uk/plumbing/polypipe/under-floor-heating-system-for-suspended-floors/, downloaded from the Internet on Aug. 16, 2016 (4 pages).
International Search Report and Written Opinion dated Jul. 9, 2018 in related International Application PCT/US18/27501 filed Apr. 13, 2018 (8 pages).
Europe Supplementary Search Report dated Nov. 3, 2020 in related Application 18785118.3 filed Apr. 13, 2018 (10 pages).

* cited by examiner

TECHNOLOGIES FOR UNDERFLOOR FLUID CONDUCTION

CROSS-REFERENCE TO RELATED APPLICATIONS

The present application is a Divisional of U.S. Nonprovisional application Ser. No. 15/727,008 filed 6 Oct. 2017; which claims the benefit of U.S. Provisional Application Ser. No. 62/485,504 filed 14 Apr. 2017; each of which is incorporated herein by reference in its entirety.

TECHNICAL FIELD

This disclosure relates to underfloor fluid conduction.

BACKGROUND

In this disclosure, where a document, an act, and/or an item of knowledge is referred to and/or discussed, then such reference and/or discussion is not an admission that the document, the act, and/or the item of knowledge and/or any combination thereof was at a priority date, publicly available, known to a public, part of common general knowledge, and/or otherwise constitutes any prior art under any applicable statutory provisions; and/or is known to be relevant to any attempt to solve any problem with which this disclosure is concerned with. Further, nothing is disclaimed.

Underfloor hydronic tubing is commonly used to warm or cool various structures, such as residential homes. However, there are several problems with how the underfloor hydronic tubing is installed.

First, the underfloor hydronic tubing can be installed such that a thermal energy transfer between the underfloor hydronic tubing and a finished floor is not maximized. For example, if the underfloor hydronic tubing is installed such that a layer of thermally insulating material, such as a wood block, is positioned between the underfloor hydronic tubing and the finished floor, then such configuration reduces the thermal energy transfer between the underfloor hydronic tubing and the finished floor. As such, there is a desire to maximize the thermal energy transfer between the underfloor hydronic tubing and the finished floor.

Second, the underfloor hydronic tubing can be installed such that the underfloor hydronic tubing is exposed, which often results in puncturing of the underfloor hydronic tubing from a piece of debris, such as a nail or a shard of glass, at a work site. As such, there is a desire to minimize exposure of the underfloor hydronic tubing.

SUMMARY

This disclosure at least partially addresses at least one of above inefficiencies. However, this disclosure can prove useful to other technical areas. Therefore, various claims recited below should not be construed as necessarily limited to addressing any of the above inefficiencies.

According to an embodiment of this disclosure, a system comprises a first plate including a first pair of legs defining a first channel; a second plate including a second pair of legs defining a second channel; a first block supporting the first plate and the second plate such that the first block is positioned between the first channel and the second channel; a second block including a U-shaped trench with a first open end portion and a second open end portion, wherein the first open end portion leads to the first channel, wherein the second open end portion leads to the second channel; a tube extending within the U-shaped trench; and a U-shaped cover covering the U-shaped trench.

According to an embodiment of this disclosure, a method comprises supporting a first plate and a second plate via a first block, wherein the first plate includes a first pair of legs defining a first channel, wherein the second plate including a second pair of legs defining a second channel, wherein the first block is positioned between the first channel and the second channel; positioning a second block including a U-shaped trench with a first open end portion and a second open end portion such that the first open end portion leads to the first channel and the second open end portion leads to the second channel; and covering a tube extending within the U-shaped trench with a U-shaped cover.

According to an embodiment of this disclosure, a device comprises a spacing jig including a block, a handle, and a plurality of legs, wherein the handle is secured to the block, wherein the legs are secured to the block such that the legs extend transversely to the block and are spaced apart from each other, wherein at least one of the legs is L-shaped.

According to an embodiment of this disclosure, a method comprises positioning a first block on a surface, wherein the first block includes a first ledge and a first wall; positioning a first leg of a segment on the first ledge against the first wall, wherein the segment includes a second leg; positioning a second block on the surface, wherein the second block includes a second ledge and a second wall, wherein the first wall faces the second wall; positioning the second leg on the second ledge against the second wall; and securing the second block to the surface.

According to an embodiment of this disclosure, a system comprises a subfloor; a finished floor; a pair of blocks positioned between the subfloor and the finished floor; and a plate including a pair of legs defining a channel, wherein the pair of blocks are supporting the plate such that the channel extends between the pair of blocks, wherein the pair of legs extends from the plate toward the subfloor, wherein the finished floor faces the pair of blocks and the plate.

According to an embodiment of this disclosure, a system comprises a subfloor; a finished floor; a block positioned between the subfloor and the finished floor, wherein the block defines a well therein; and a plate including a pair of legs defining a channel, wherein the block supports the plate such that the channel extends within the well, wherein the pair of legs extends from the plate toward the subfloor, wherein the finished floor faces the block and the plate.

According to an embodiment of this disclosure, a device comprises a U-shaped plate; and a hydronic tube coupled to the U-shaped plate.

This disclosure is embodied in various forms illustrated in a set of accompanying illustrative drawings. Note that variations are contemplated as being a part of this disclosure, limited only by a scope of various claims recited below.

BRIEF DESCRIPTION OF DRAWINGS

The set of accompanying illustrative drawings shows various example embodiments of this disclosure. Such drawings are not to be construed as necessarily limiting this disclosure. Like numbers and/or similar numbering scheme can refer to like and/or similar elements throughout.

DETAILED DESCRIPTION OF PREFERRED EMBODIMENTS

Figure 1:
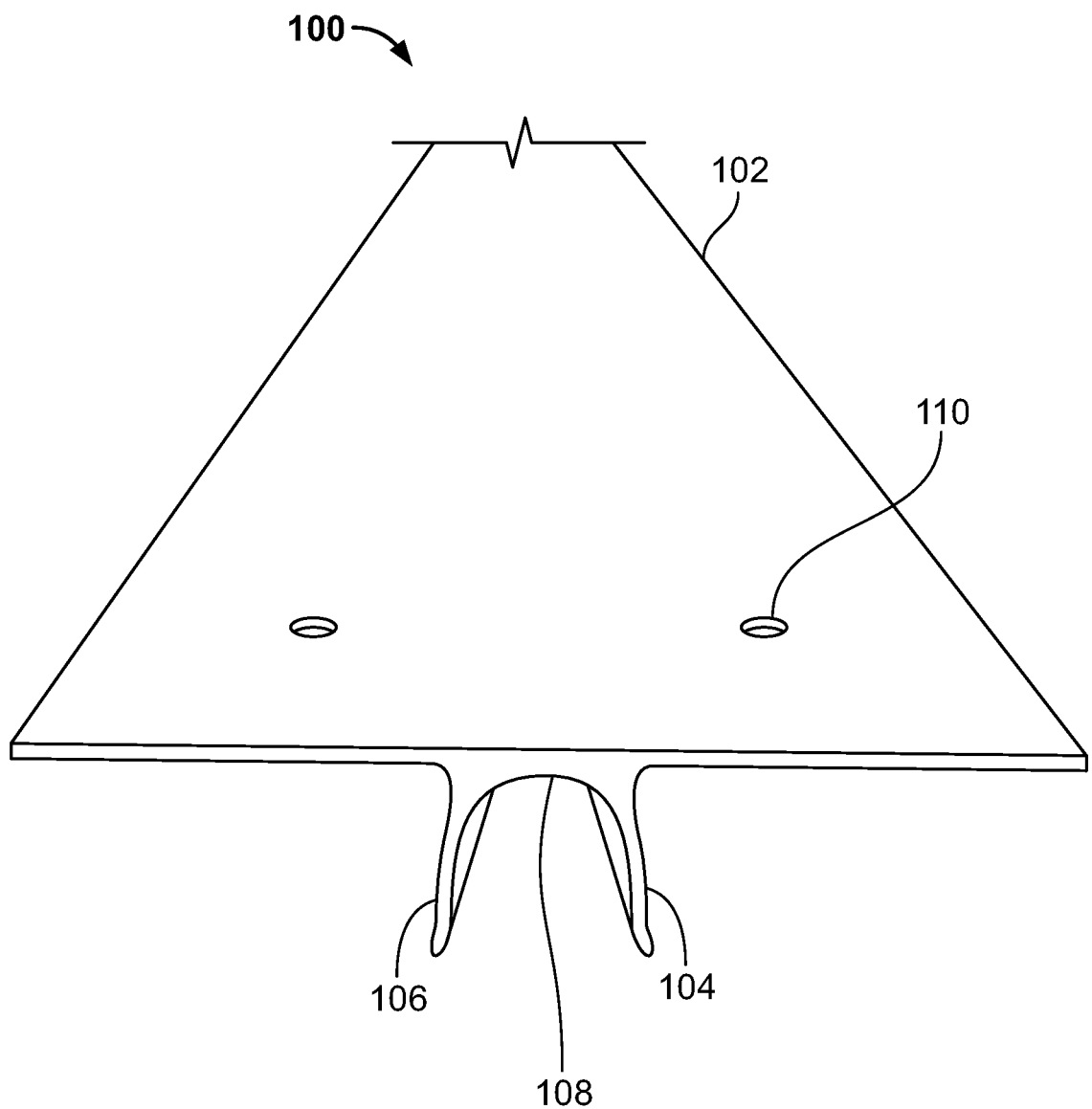
FIG. 1 shows an embodiment of a tube engagement unit according to this disclosure.

This disclosure is now described more fully with reference to the set of accompanying illustrative drawings, in which example embodiments of this disclosure are shown. This disclosure can be embodied in many different forms and should not be construed as necessarily being limited to the example embodiments disclosed herein. Rather, the example embodiments are provided so that this disclosure is thorough and complete, and fully conveys various concepts of this disclosure to those skilled in a relevant art.

Features described with respect to certain example embodiments can be combined and sub-combined in and/or with various other example embodiments. Also, different aspects and/or elements of example embodiments, as disclosed herein, can be combined and sub-combined in a similar manner as well. Further, some example embodiments, whether individually and/or collectively, can be components of a larger system, wherein other procedures can take precedence over and/or otherwise modify their application. Additionally, a number of steps can be required before, after, and/or concurrently with example embodiments, as disclosed herein. Note that any and/or all methods and/or processes, at least as disclosed herein, can be at least partially performed via at least one entity in any manner.

Various terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from various teachings of this disclosure.

Various terminology used herein is for describing particular example embodiments and is not intended to be necessarily limiting of this disclosure. As used herein, various singular forms "a," "an" and "the" are intended to include various plural forms as well, unless a context clearly indicates otherwise. Various terms "comprises," "includes" and/or "comprising," "including" when used in this specification, specify a presence of stated features, integers, steps, operations, elements, and/or components, but do not preclude the presence and/or addition of one or more other features, integers, steps, operations, elements, components, and/or groups thereof.

As used herein, a term "or" is intended to mean an inclusive "or" rather than an exclusive "or." That is, unless specified otherwise, or clear from context, "X employs A or B" is intended to mean any of a set of natural inclusive permutations. That is, if X employs A; X employs B; or X employs both A and B, then "X employs A or B" is satisfied under any of the foregoing instances.

Example embodiments of this disclosure are described herein with reference to illustrations of idealized embodiments (and intermediate structures) of this disclosure. As such, variations from various illustrated shapes as a result, for example, of manufacturing techniques and/or tolerances, are to be expected. Thus, various example embodiments of this disclosure should not be construed as necessarily limited to various particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing, and/or other any other types of manufacturing. For example, some manufacturing processes include three dimensional (3D) printing, laser cutting, computer numerical control routing, milling, pressing, stamping, vacuum forming, hydroforming, injection molding, lithography, and so forth.

Any and/or all elements, as disclosed herein, can be and/or include, whether partially and/or fully, a solid, including a metal, a mineral, an amorphous material, a ceramic, a glass ceramic, an organic solid, such as wood and/or a polymer, such as rubber, a composite material, a semiconductor, a nanomaterial, a biomaterial and/or any combinations thereof. Any and/or all elements, as disclosed herein, can be and/or include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, opaqueness, luminescence, reflection, phosphorescence, anti-reflection and/or holography, a photo-sensitive coating, an electronic and/or thermal property coating, such as for passivity, insulation, resistance or conduction, a magnetic coating, a water-resistant and/or waterproof coating, a scent coating and/or any combinations thereof. Any and/or all elements, as disclosed herein, can be rigid, flexible, and/or any other combinations thereof. Any and/or all elements, as disclosed herein, can be identical and/or different from each other in material, shape, size, color and/or any measurable dimension, such as length, width, height, depth, area, orientation, perimeter, volume, breadth, density, temperature, resistance, and so forth.

Unless otherwise defined, all terms (including technical and scientific terms) used herein have the same meaning as commonly understood by one of ordinary skill in an art to which this disclosure belongs. Various terms, such as those defined in commonly used dictionaries, should be interpreted as having a meaning that is consistent with a meaning in a context of a relevant art and should not be interpreted in an idealized and/or overly formal sense unless expressly so defined herein.

Furthermore, relative terms such as "below," "lower," "above," and "upper" can be used herein to describe one element's relationship to another element as illustrated in the set of accompanying illustrative drawings. Such relative terms are intended to encompass different orientations of illustrated technologies in addition to an orientation depicted in the set of accompanying illustrative drawings. For example, if a device in the set of accompanying illustrative drawings were turned over, then various elements described as being on a "lower" side of other elements would then be oriented on "upper" sides of other elements. Similarly, if a device in one of illustrative figures were turned over, then various elements described as "below" or "beneath" other elements would then be oriented "above" other elements. Therefore, various example terms "below" and "lower" can encompass both an orientation of above and below.

As used herein, a term "about" and/or "substantially" refers to a +/−10% variation from a nominal value/term. Such variation is always included in any given value/term provided herein, whether or not such variation is specifically referred thereto.

If any disclosures are incorporated herein by reference and such disclosures conflict in part and/or in whole with this disclosure, then to an extent of a conflict, if any, and/or a broader disclosure, and/or broader definition of terms, this disclosure controls. If such disclosures conflict in part and/or in whole with one another, then to an extent of a conflict, if any, a later-dated disclosure controls.

FIG. 1 shows an embodiment of a tube engagement unit according to this disclosure. A tube engagement unit 100 includes a plate 102 and a receptacle 104. The plate 102 and the receptacle 104 are unitary, such as monolithic. In some embodiments, the plate 102 is assembled with the receptacle 104, such as via fastening, adhering, magnetizing, mating, or other means or methods. In some embodiments, the unit 100 is structured, manufactured, and used, as disclosed in U.S. Pat. No. 5,454,428, which is fully incorporated by reference herein.

The plate 102 is rectilinearly elongated, rectangularly shaped, and includes a thermally conductive material, such as metal, such as copper, iron, aluminum, or others, or an alloy, such as steel, brass, bronze, or others. Note that variations on such structure are possible, such as the plate 102 being non-rectilinearly elongated, such as sinusoidal, arcuate, pulsating, zigzag, or others, the plate 102 being non-rectangularly shaped, such as any polygonal shape, or any other variation in constituency, size, shape, or other characteristics.

In one or more embodiments, the plate 102 includes a plurality of bores 110 bored therethrough such that the receptacle 104 is positioned therebetween. The bores 110 are circular, but other shapes are possible, such as ovoid, elliptical, or others. The bores 110 are threaded, but may be smooth. The bores 110 are identical in shape and size, but can differ in shape, size, or any other characteristic, including positioning. In one or more embodiments, the plate 102 does not include bores 110.

The receptacle 104 is defined via a pair of legs 106 and includes a thermally conductive material, such as metal, such as copper, iron, aluminum, or others, or an alloy, such as steel, brass, bronze, or others. The legs 106 extend from the plate 102 away from the plate 102 and longitudinally along a length of the plate 102 such that the legs 106 oppose each other and a channel 108 is defined via the legs 106. Such opposition of the legs 106 enables the receptacle 104 to have a U-shape, C-shape, or V-shape cross-section. At least one of the legs 106 is externally and internally smooth, but can include depressions, projections, grooves, bores, maters, fasteners, magnets, adhesives, or other structures.

Figure 2:
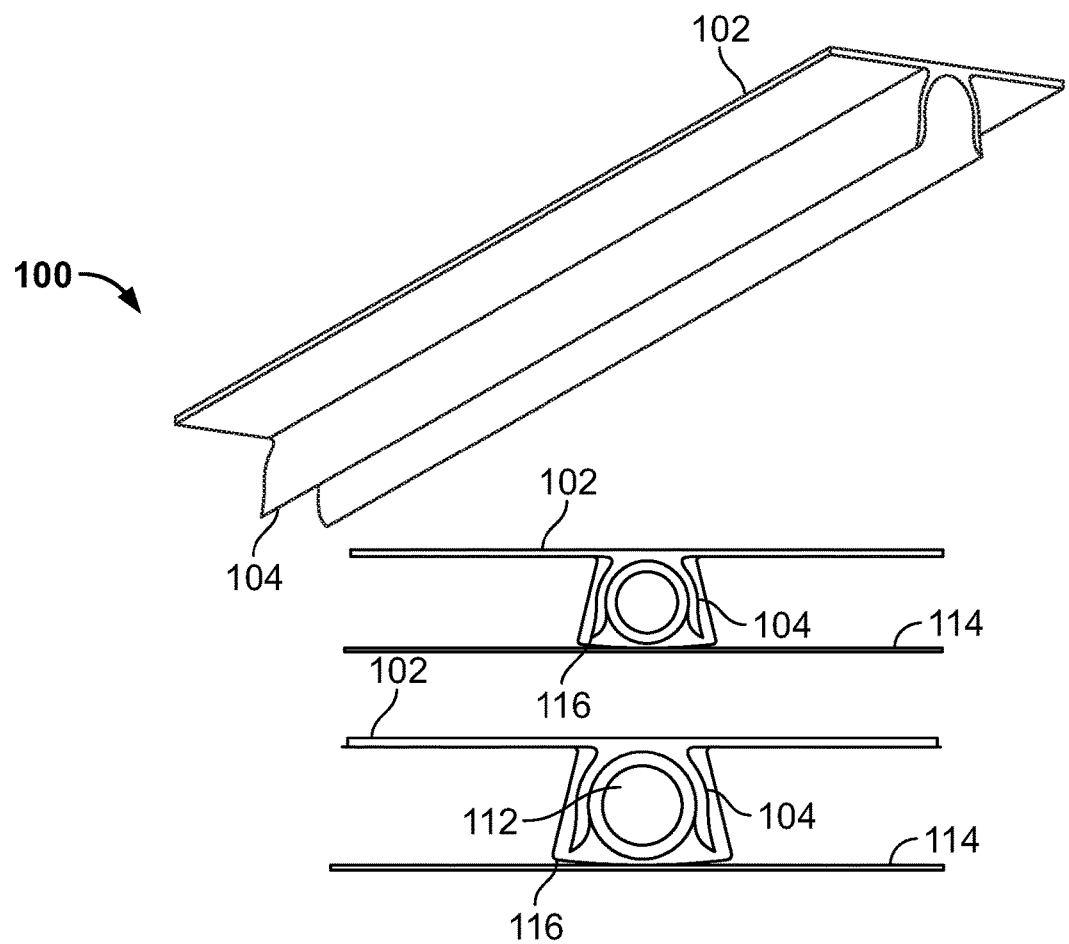
FIG. 2 shows an embodiment of a tube engagement unit engaging a tube while resting on a block with a well such that the tube is positioned within the well according to this disclosure.

FIG. 2 shows an embodiment of a tube engagement unit engaging a tube while resting on a block with a well such that the tube is positioned within the well according to this disclosure. The tube engagement unit 100 retains a tube 112 in the channel 108 between the legs 106. The tube 112 can be retained via inward pressure via the legs 106 onto the tube 112, such as via friction. In some embodiments, the tube 112 is secured to the receptacle 104 via adhering, magnets, fastening, mating, or other ways. The tube 112 is used for underfloor fluid conduction, such as for radiant heating or cooling. For example, the tube 112 can conduct a liquid, such as water, or a mixture of liquids, such as water and alcohol or antifreeze or salt.

The tube engagement unit 100 is supported via a block 114, such as a sleeper, which contains a well 116 therein such that the tube 112 within the channel 108 is positioned within the well 116. The well 116 can be C-shaped, U-shaped, or V-shaped in cross-section. The tube 112 can be in contact with a bottom surface of the well 116 or avoid contacting the bottom surface 116 such that a gap exists therebetween. Similarly, the legs 106 can be in contact with a sidewall of the well 116 or avoid contacting the sidewall such that a gap exists therebetween. The block 114 includes a thermally insulating material, such as wood, such as plywood. Although the block 114 is shown as a single block 114, a pair of the blocks 114 can be positioned immediately adjacent to each other in order to define the well 116. For example, the pair of blocks 114 can be symmetrical to each other, although the pair of blocks 114 can be asymmetrical to each other or be identical to or different from each other in any physical property, such as shape, size, constituency, conductivity, coatings, or others.

Figure 3:
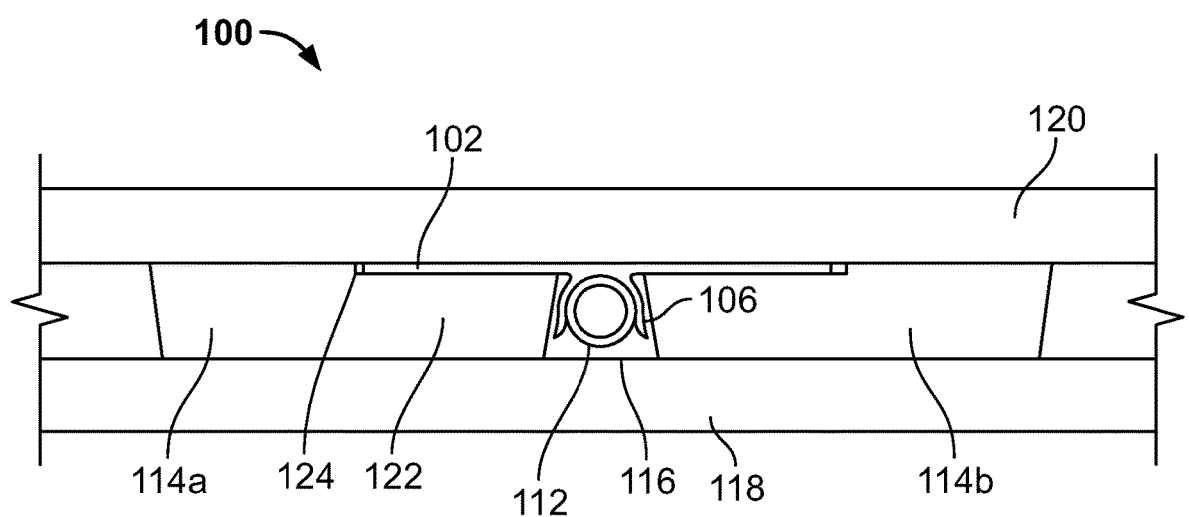
FIG. 3 shows an embodiment of a tube engagement unit being positioned in context of a subfloor and a finished floor where the tube engagement unit is supported via a pair of tailless blocks according to this disclosure.

FIG. 3 shows an embodiment of a tube engagement unit being positioned in context of a subfloor and a finished floor where the tube engagement unit is supported via a pair of tailless blocks 114a, 114b according to this disclosure. The tube engagement unit 100 is positioned in context of a subfloor 118 and a finished floor 120, which oppose each other. Each of the blocks 114a, 114b is tailless, is positioned between the subfloor 118 and the finished floor 120, and includes a ledge 122 and a wall 124 defining the ledge 122. The blocks 114a, 114b are trapezoidal in cross-section, but other shapes are possible, whether symmetric or asymmetric, such as square, a rectangle, a triangle, an oval, a circle, or any other polygonal or non-polygonal shape. The subfloor 118 and the blocks 114a, 114b define the well 116 therebetween, in which the tube 112 extends, while avoiding contact with the subfloor 118 such that a gap exists therebetween. The plate 102 is supported via the ledges 122 such that the plate 102 is between the walls 124. In some embodiments, the plate 102 can be contacting at least one of the walls 124. The legs 106 avoid contact with the blocks 114a, 114b, while extending toward the subfloor 118. The finished floor 120 faces the blocks 114a, 114b and the plate 102. The finished floor 120 can be in contact with the plate 102.

Figure 4:
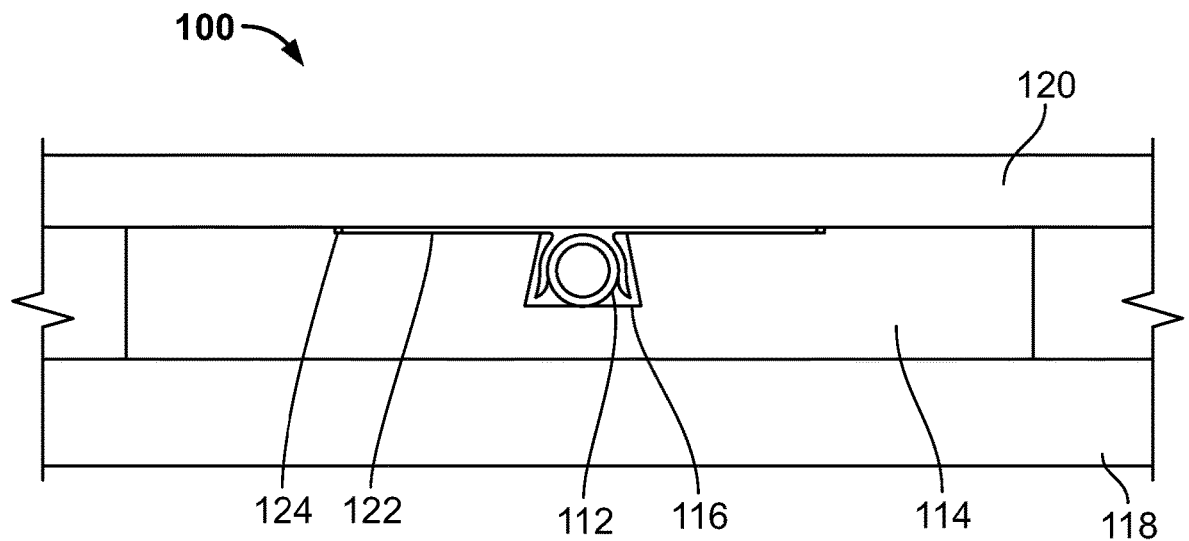
FIG. 4 shows an embodiment of a tube engagement unit being positioned in context of a subfloor and a finished floor where the tube engagement unit is supported via a single block according to this disclosure.

FIG. 4 shows an embodiment of a tube engagement unit being positioned in context of a subfloor and a finished floor where the tube engagement unit is supported via a single block according to this disclosure. In contrast to FIG. 3, the tube engagement unit 100 is supported via a single block 114, which defines the well 116 therein. The tube 112 is in contact with the bottom of the well 116.

Figure 5:
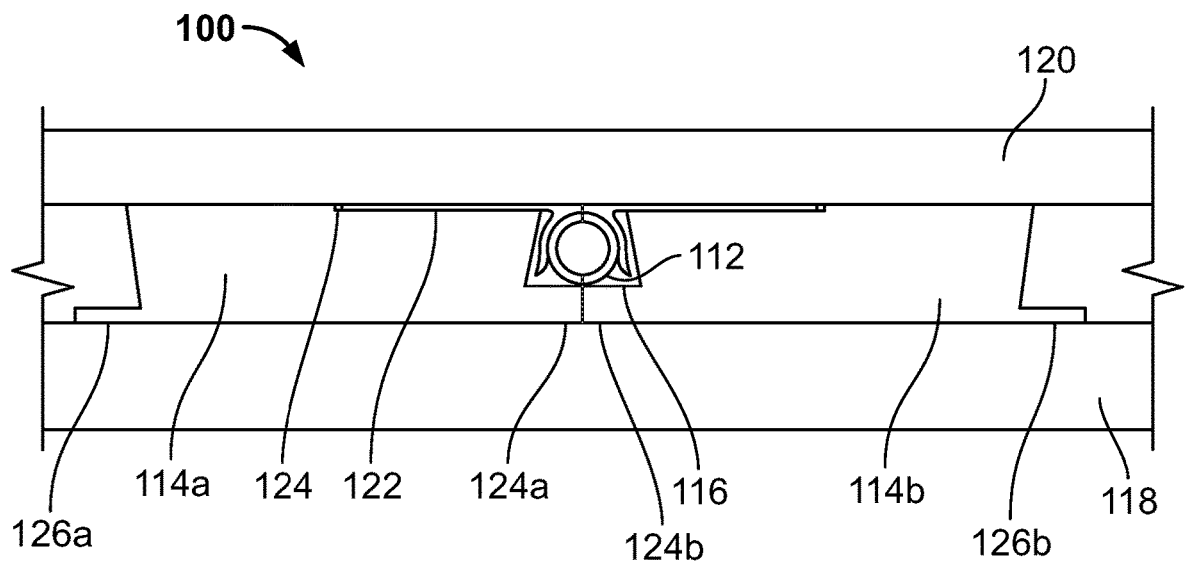
FIG. 5 shows an embodiment of a tube engagement unit being positioned in context of a subfloor and a finished floor where the tube engagement unit is supported via a pair of tailed blocks according to this disclosure.

FIG. 5 shows an embodiment of a tube engagement unit being positioned in context of a subfloor and a finished floor where the tube engagement unit is supported via a pair of tailed blocks according to this disclosure. In contrast to FIGS. 3 and 4, the tube engagement unit 100 is supported via a pair of tailed blocks 114a, 114b positioned immediately adjacent to each other, where each of the tailed blocks 114a, 114b includes a first elongated tail 124a, 124b and a second elongated tail 126a, 126b, respectively. As such, the tailed blocks 114a, 114b define the well 116, where the tube 112 avoids contact with the tails 124a, 124b, while the legs 106 avoid contact with the tailed blocks 114a, 114b. In some embodiments, at least one of the tails 124a, 124b, 126a, 126b can be configured for fastening, mating, adhering, interlocking, magnetizing, or other securing ways to other tails, blocks, surfaces, walls, or other structures.

Figure 6:
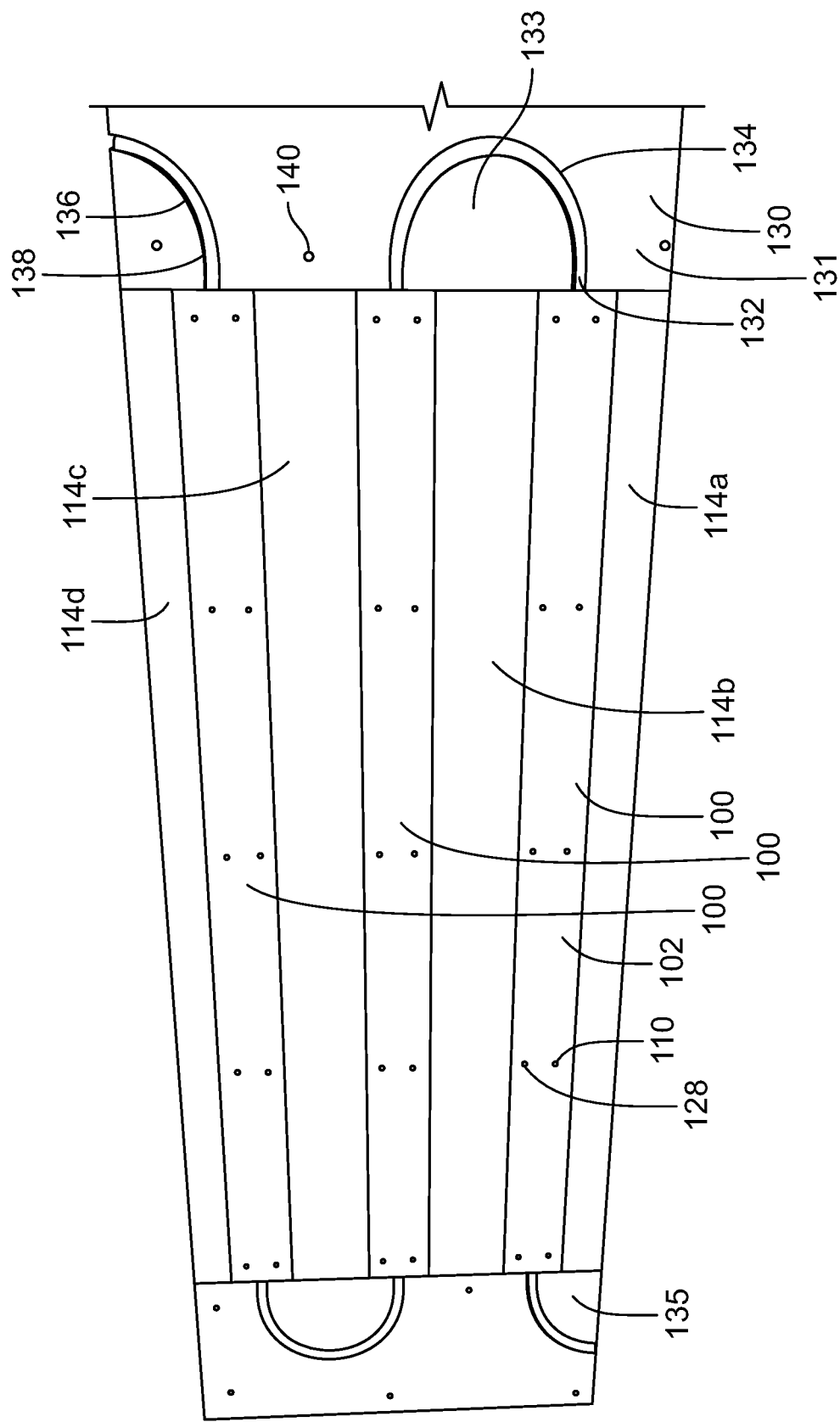
FIGS. 6 and 7 shows an embodiment of an installation having a plurality of tube engagement units according to this disclosure.
Figure 7:
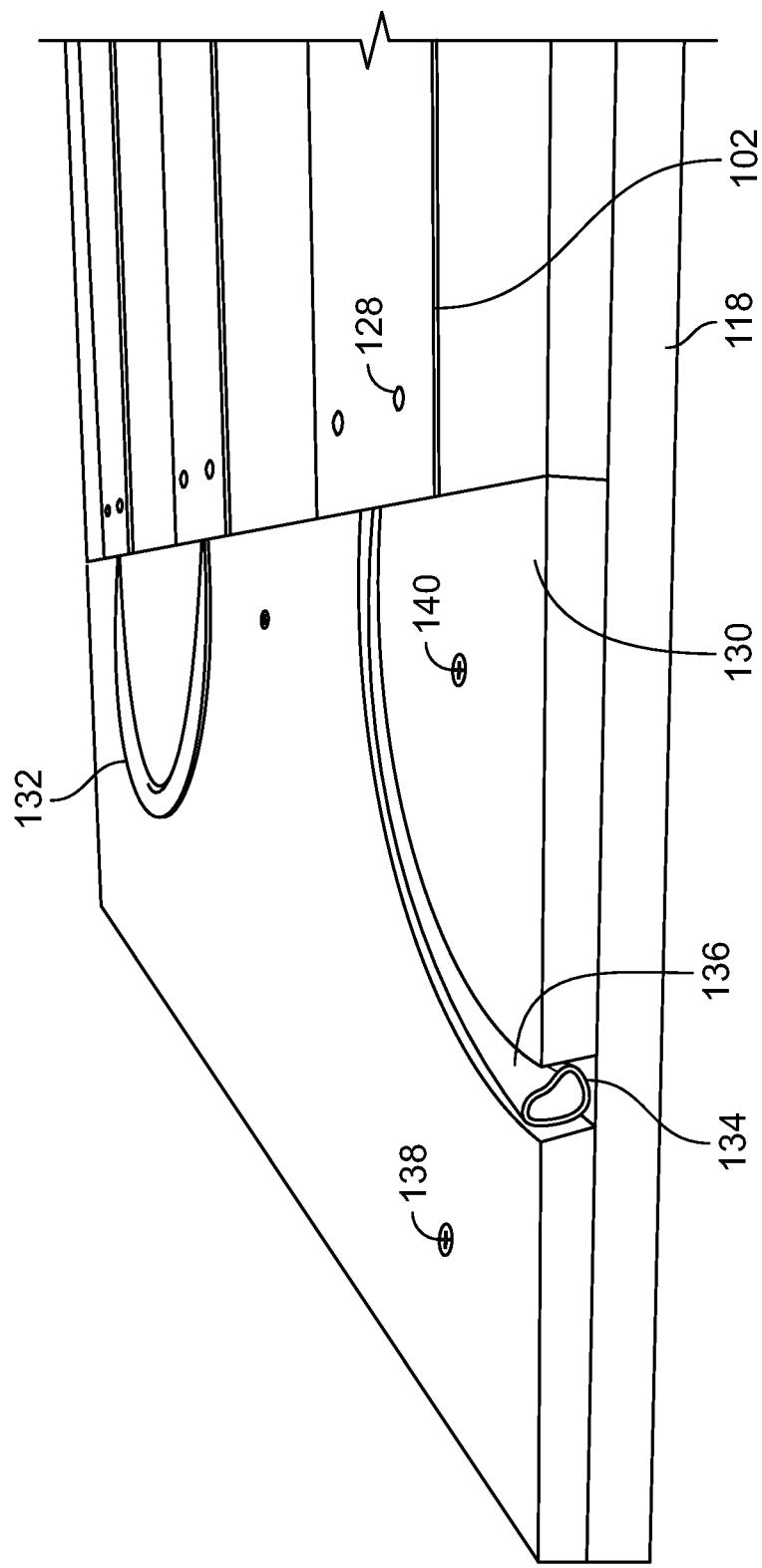

FIGS. 6 and 7 show an embodiment of an installation having a plurality of tube engagement units according to this disclosure. The tube engagement units 100 are supported via the blocks 114a, 114b, 114c, 114d, where the tube engagement units 100 and the blocks 114a, 114b, 114c, 114d alternate in a rectilinearly parallel manner, although other configurations are possible, as disclosed herein. The tube engagement units 100 and the blocks 114a, 114b, 114c, 114d are positioned between a plurality of blocks 130, such as a plurality of sleepers.

The blocks 130 define a plurality of bores 138 bored therethrough, such as for fastening to the subfloor 118. The bores 138 are circular, but other shapes are possible, such as ovoid, elliptical, or others. The bores 138 are smooth, but may be threaded. The bores 138 are identical in shape and size, but can differ in shape, size, or any other characteristic, including positioning. The bores 138 host a plurality of fasteners 140, such as screws, bolts, nails, or others, whether identical to or different from each other in structure, function, or positioning. The fasteners 140 fasten the blocks 130 to the subfloor 118. Similarly, the bores 110 host a plurality of fasteners 128, such as screws, bolts, nails, or others, whether identical to or different from each other in structure, function, or positioning. The fasteners 128 fasten the tube engagement units 100 to the blocks 114a, 114b, 114c, 114d.

The blocks 130 define a plurality of U-shaped trenches 132 and a plurality of arcuate trenches 136. Each of the U-shaped trenches 132 includes a first open end portion and a second open end portion. Each of the arcuate trenches 136 includes a first open end portion and a second open end portion. As fully assembled, the first open end portions and the second open end portions of the U-shaped trenches 132 and the arcuate trenches 136 are aligned with the channels 108. Therefore, the tube 112 is routed in a serpentine manner via the tube engagement units 100, as supported via the blocks 114a, 114b, 114c, 114d, and via the U-shaped trenches 132 and via the arcuate trenches 136. Note that a plurality of portions 134 of the tube 112 in the U-shaped trenches 132 and in the arcuate trenches 136 are exposed.

Figure 8:
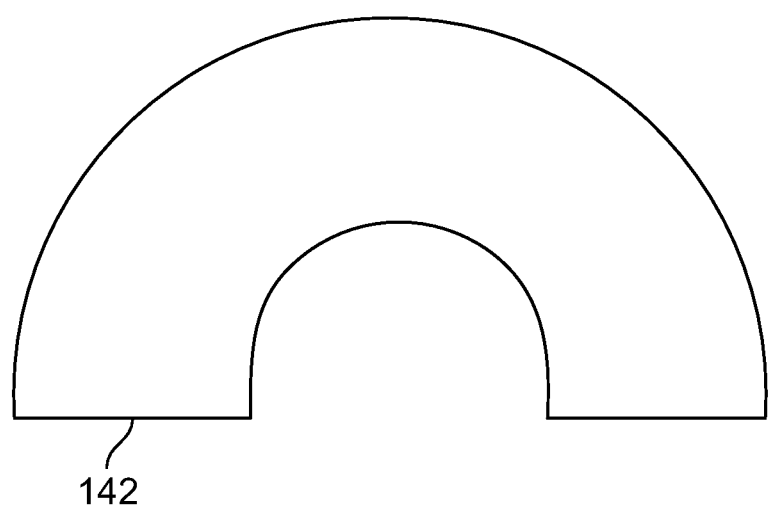
FIG. 8 shows an embodiment of a U-shaped cover according to this disclosure.
Figure 9:
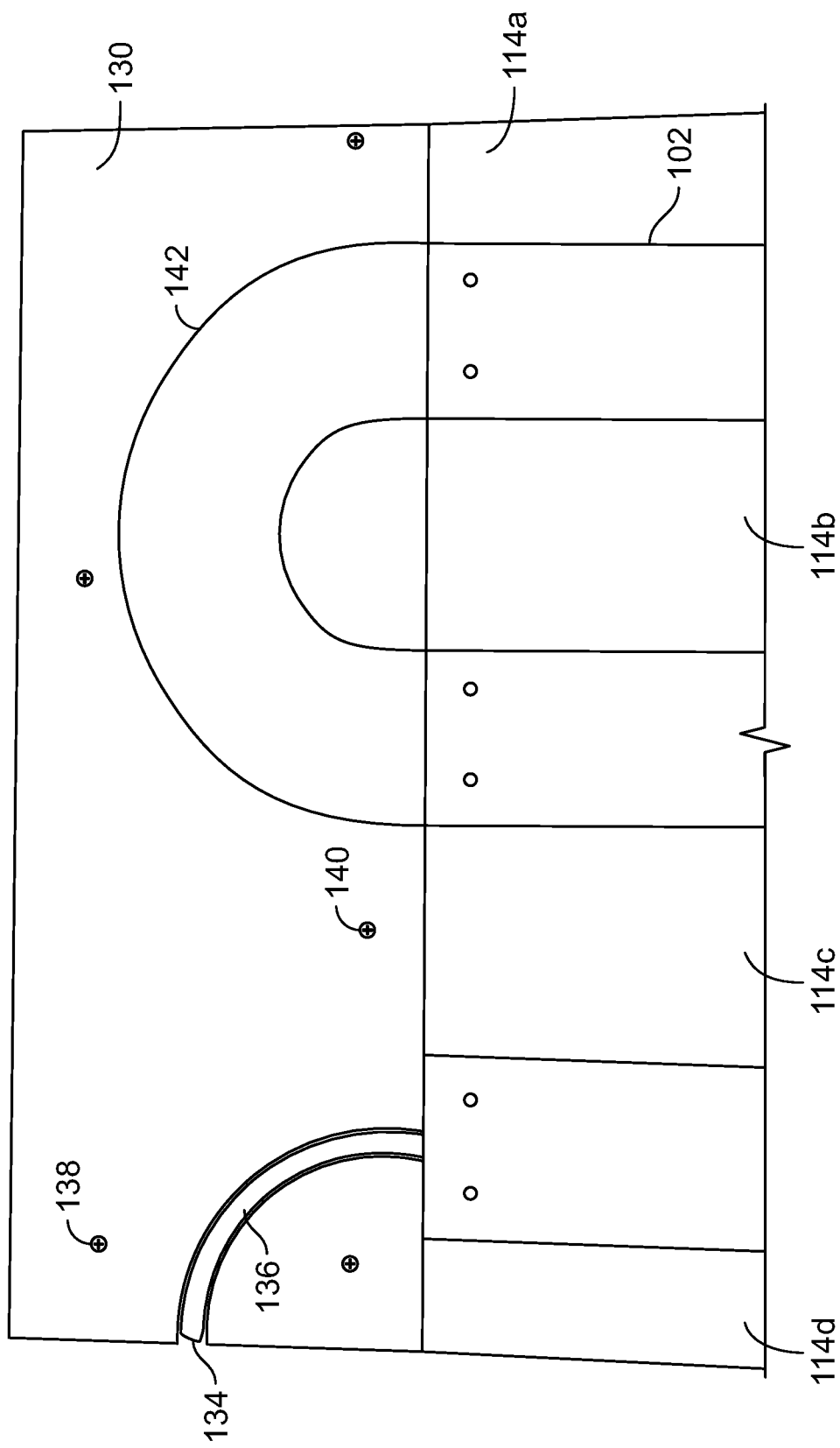
FIG. 9 shows an embodiment of a U-shaped cover covering a U-shaped trench such that a tube is positioned therebetween according to this disclosure.

FIG. 8 shows an embodiment of a U-shaped cover according to this disclosure. FIG. 9 shows an embodiment of a U-shaped cover covering a U-shaped trench such that a tube is positioned therebetween according to this disclosure. A U-shaped cover 142 structured to cover the U-shaped trench 132 such that the tube 112 extends between the U-shaped trench 132 and the U-shaped cover 142. The U-shaped cover 142 may be unsecured to the block 130 or adjacent blocks 114 or secured to the block 130 or adjacent blocks 114. For example, such securing can be via fastening, mating, adhering, magnetizing, nailing, or other securing techniques. The U-shaped cover 142 includes a thermally conductive material, such as metal, such as copper, iron, aluminum, or others, or an alloy, such as steel, brass, bronze, or others. The U-shaped plate 142 is solid, but can be perforated. The U-shaped plate 142 is planar and flat, but variations are possible, such as via depressions or projections. The U-shaped cover 142 can include a bore or can include a magnetic area. The U-shaped cover 142 extends longitudinally as a rectangular strip, but variations are possible, such as trapezoidal or others. In some embodiments, the arcuate trench 136 is covered with an arcuate cover, which may be similar to the U-shaped cover 142, as disclosed herein, such as when the arcuate trench 136 does not return back towards the block 114d and runs rectilinearly along the block 130 or away from the block 130, such as to form an S-shape. Note that the plate 102 and the U-shaped cover 142 shield the tube 112 from puncture, such as from nails or sharp objects, or external pressure, such as a dropped heavy object or a worker foot, or others undesired forces or objects. As such, the plate 102 or the U-shaped cover 142 acts as a heat transfer plate while also providing a structural protection to prevent undesired forces, such as nails or screws, from penetrating into the tube 112 during flooring installation.

In one or more embodiments, the U-shaped cover 142 is coupled to the tube 112 using a compound, such as, for example, a heat sink compound. In one or more embodiments, the heat sink compound is an adhesive, such as, for example, glue, paste, silicone, gel, epoxy, urethane, acrylate, or other adhesives. In one or more embodiments, the compound includes a thermally conductive, metal oxide powder, such as, for example, aluminum oxide, boron nitride, zinc oxide, aluminum nitride, or other metal or metal oxide, metal boride or metal nitride powders. In one or more embodiments, the heat sink compound is used to couple the tube engagement unit 100 to the tube 112 in place of or in addition to the legs 106.

In one or more embodiments, each of the blocks 130, includes sub-blocks 131, 133, and 135 positioned between the subfloor 118 and the finished floor 120. Each of the sub-blocks 131 have semi-circular and/or quarter circular cutouts. Each of the sub-blocks 133 are semi-circles, and each of the sub-blocks 135 are quarter circles. In one or more embodiments, each of the sub-blocks includes a ledge and a wall defining the ledge. In one or more embodiments, the sub-blocks 131, 133 and/or 135 have an angular cross-section on the curved edges, but other shapes are possible, whether symmetric or asymmetric, such as square, a rectangle, a triangle, an oval, a circle, or any other polygonal or non-polygonal shape.

Figure 10:
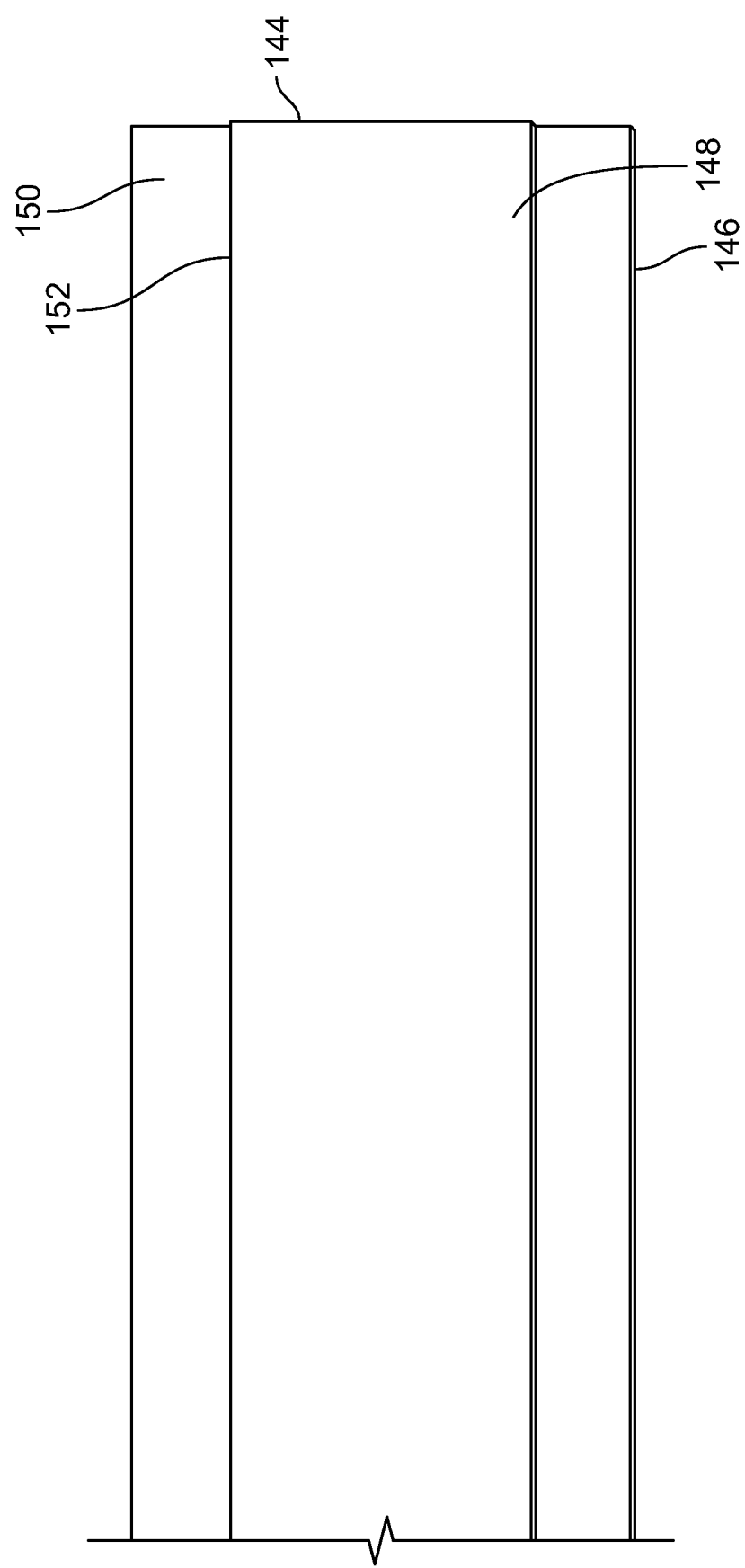
FIG. 10 shows an embodiment of a block for supporting a tube engagement device according to this disclosure.
Figure 11:
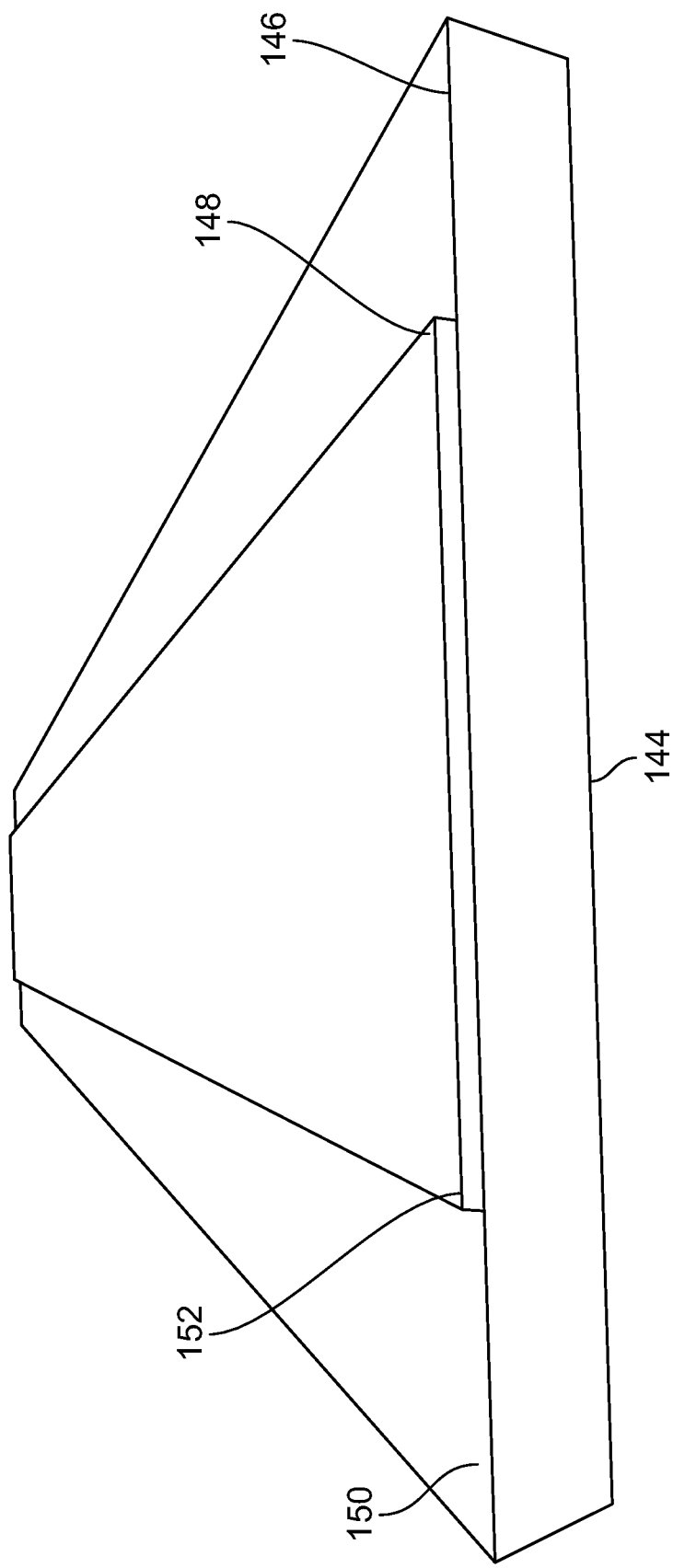
FIG. 11 shows an embodiment of a block for supporting a tube engagement device according to this disclosure.

FIG. 10 shows an embodiment of a block for supporting a tube engagement device according to this disclosure. FIG. 11 shows an embodiment of a block for supporting a tube engagement device according to this disclosure. A block 144, such as a sleeper, is elongated and T-shaped as defined via a pair of ledges 146, 150 extending from a stem as defined via a pair of walls 148, 152. The block 144 includes a thermally insulating material, such as wood, such as plywood. The block 144 is solid, but can be perforated. The block 144 can include a bore or can include a magnet. The block 144 is planar and flat, but variations are possible, such as via depressions or projections. Each of the ledges 146, 150 can support the plate 102.

Figure 12:
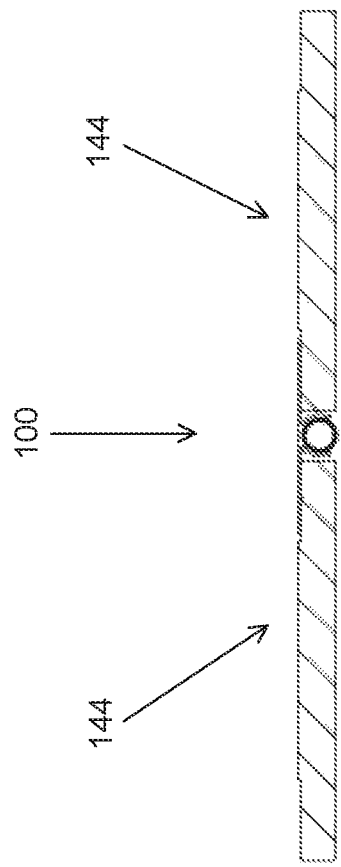
FIG. 12 shows an embodiment of a tube engagement unit being supported via a pair of blocks according to this disclosure.

FIG. 12 shows an embodiment of a tube engagement unit being supported via a pair of blocks according to this disclosure. The tube engagement unit 100 is supported via a pair of the blocks 144 such that the tube engagement unit 100 is positioned therebetween.

Figure 13:
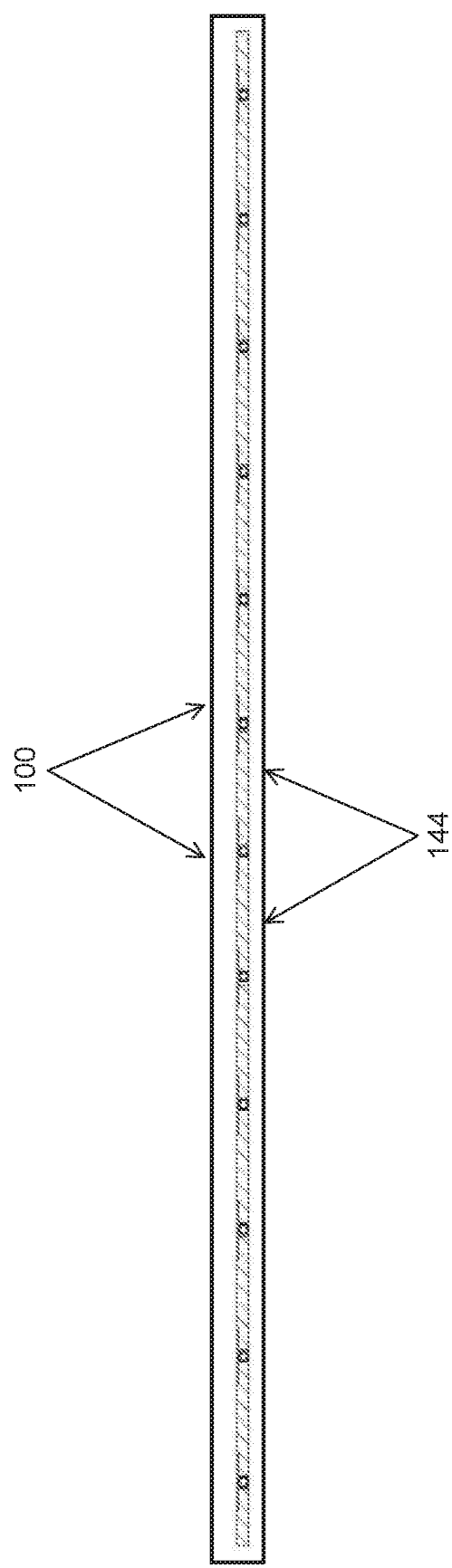
FIG. 13 shows an embodiment of a plurality of blocks supporting a plurality of tube engagement units according to this disclosure.

FIG. 13 shows an embodiment of a plurality of blocks supporting a plurality of tube engagement units according to this disclosure. The tube engagement units 100 are supported via the blocks 144 such that the tube engagement units 100 are alternately positioned therebetween.

Figure 14:
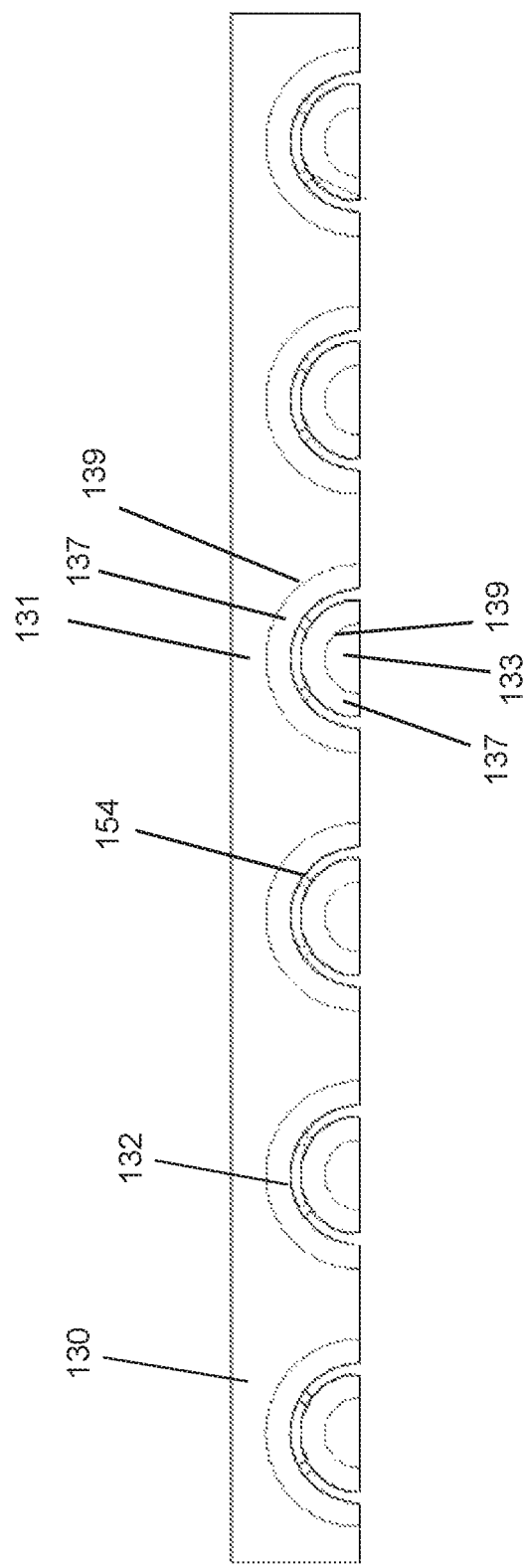
FIG. 14 shows an embodiment of a block defining a plurality of U-shaped trenches therein according to this disclosure.

FIG. 14 shows an embodiment of a block defining a plurality of U-shaped trenches therein according to this disclosure. In context of FIG. 13, the block 130 defines a plurality of U-shaped trenches 132 therein, each of the trenches 132 hosting a tube place holder 154. Each of the U-shaped trenches 132 enabling routing of the tube 112 between a pair of the tube engagement units 100. In context of FIG. 14, each of the sub-blocks 131 and 133 includes a ledge 137 and a wall 139 defining the ledge.

Figure 15:
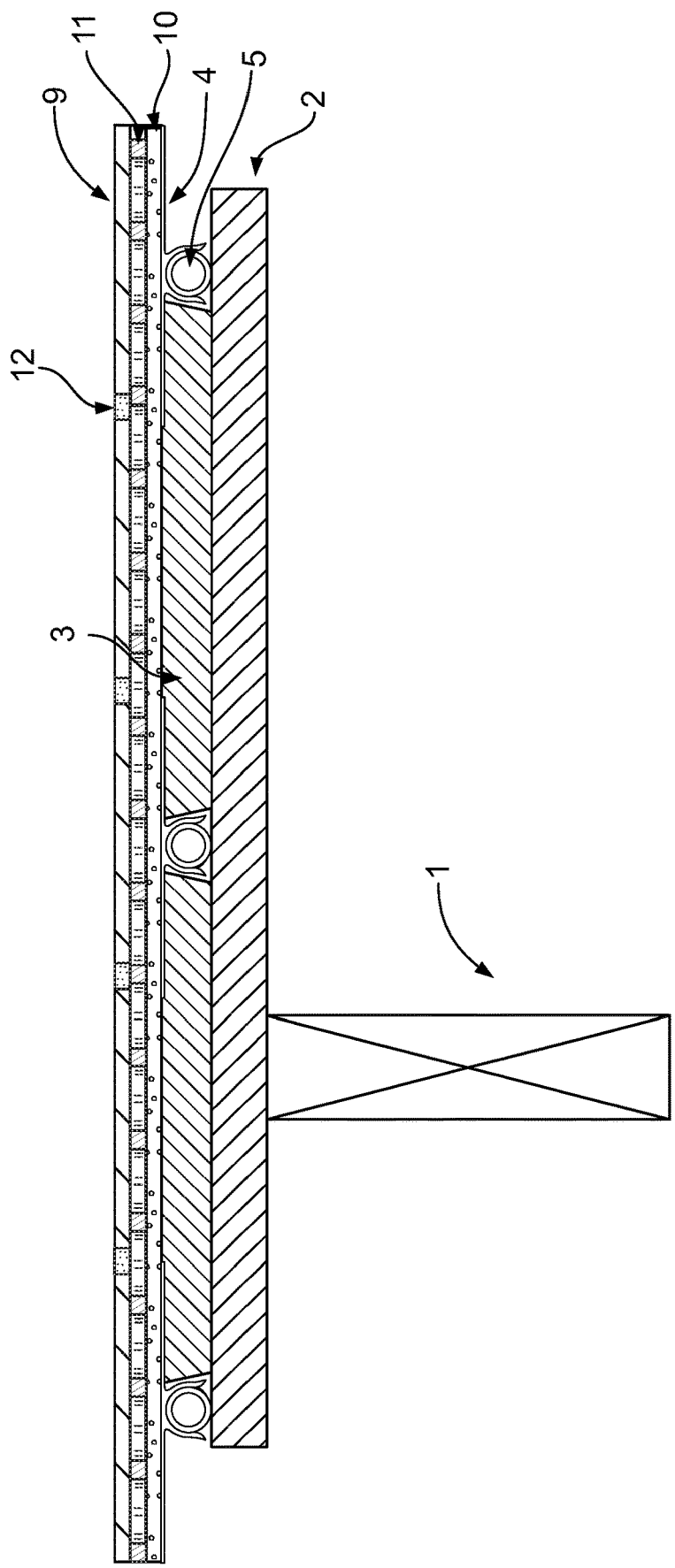
FIG. 15 shows an embodiment of a first mode of installation of underfloor hydronic tubing according to this disclosure.
Figure 16:
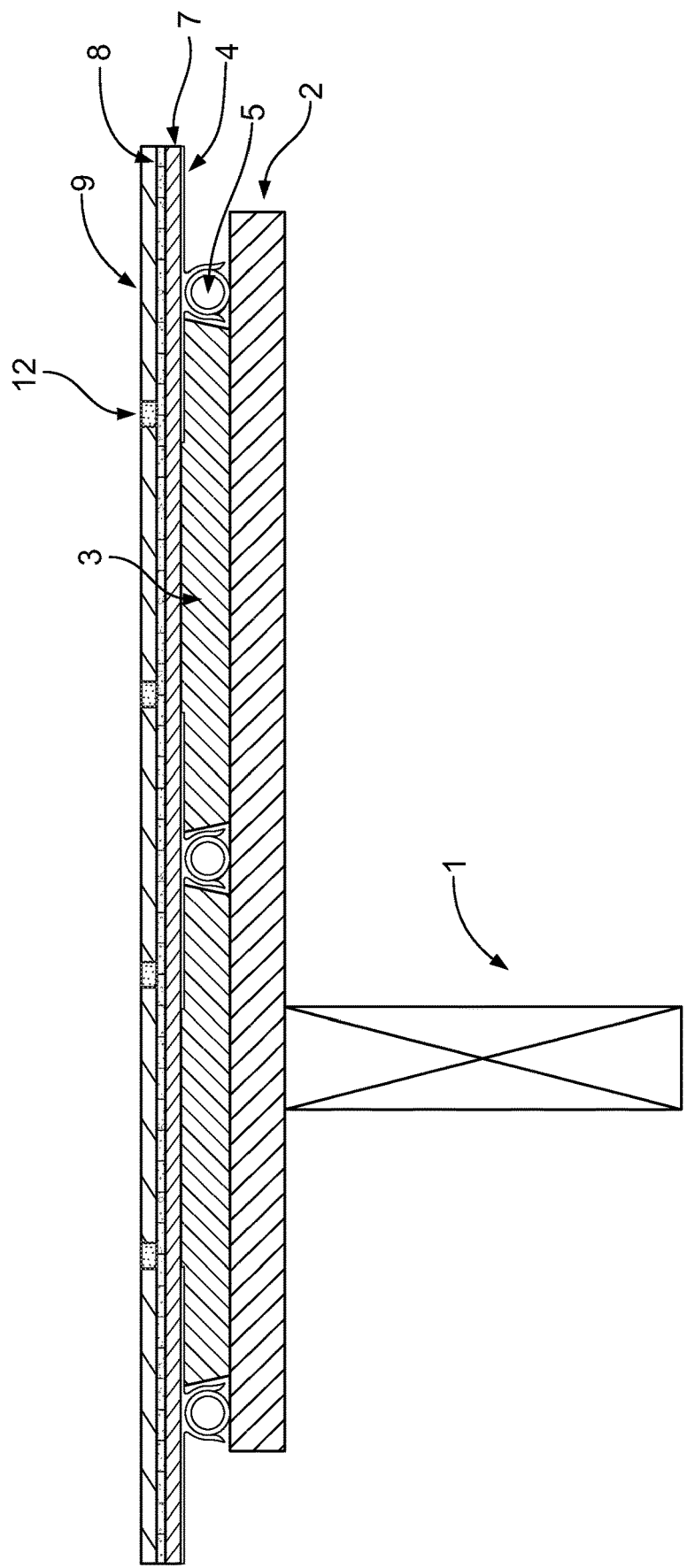
FIG. 16 shows an embodiment of a second mode of installation of underfloor hydronic tubing according to this disclosure.
Figure 17:
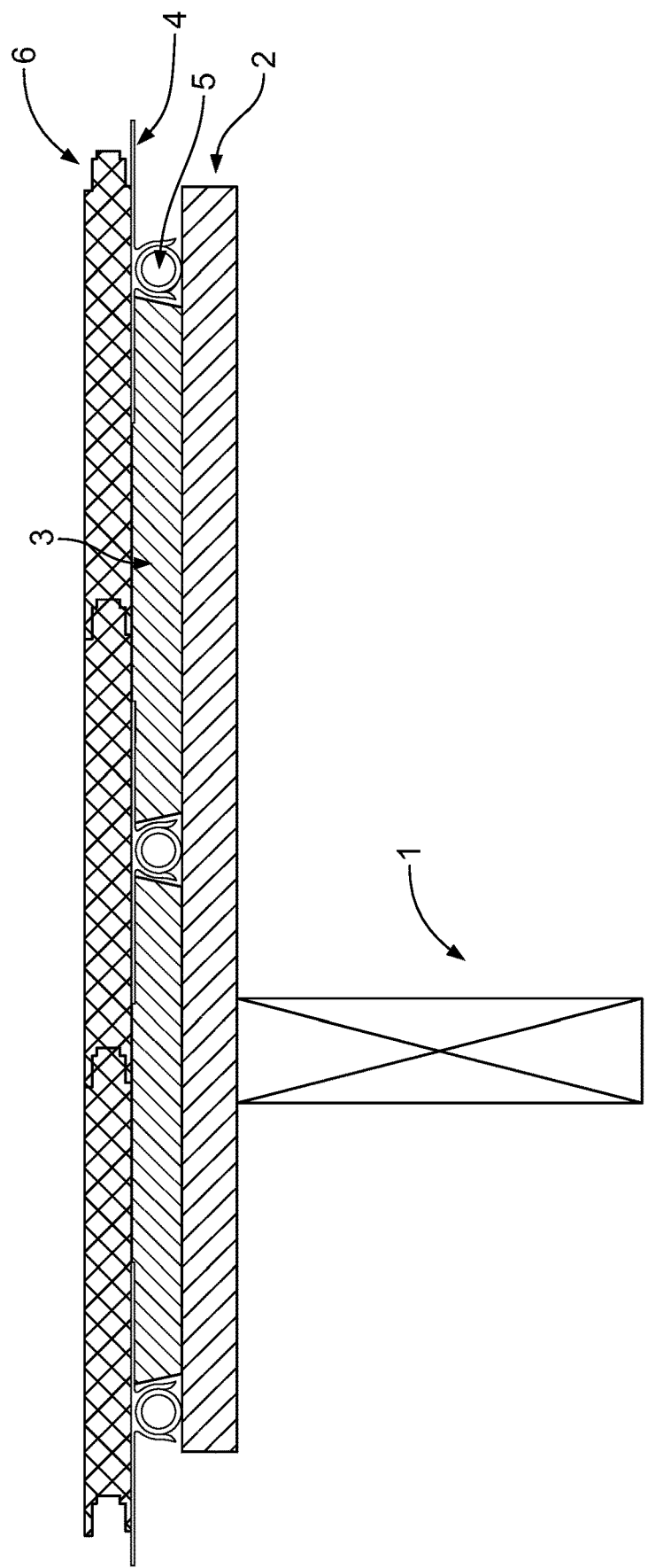
FIG. 17 shows an embodiment of a third mode of installation of underfloor hydronic tubing according to this disclosure.

FIG. 15 shows an embodiment of a first mode of installation 150 of underfloor hydronic tubing according to this disclosure. FIG. 16 shows an embodiment of a second mode of installation 160 of underfloor hydronic tubing according to this disclosure. FIG. 17 shows an embodiment of a third mode of installation 170 of underfloor hydronic tubing according to this disclosure. Each of the first mode of installation 150, the second mode of installation 160, and the third mode of installation 170 is shown in cross-section, with each layer identified in a part list on respective FIGS. 15-17.

Figure 18:
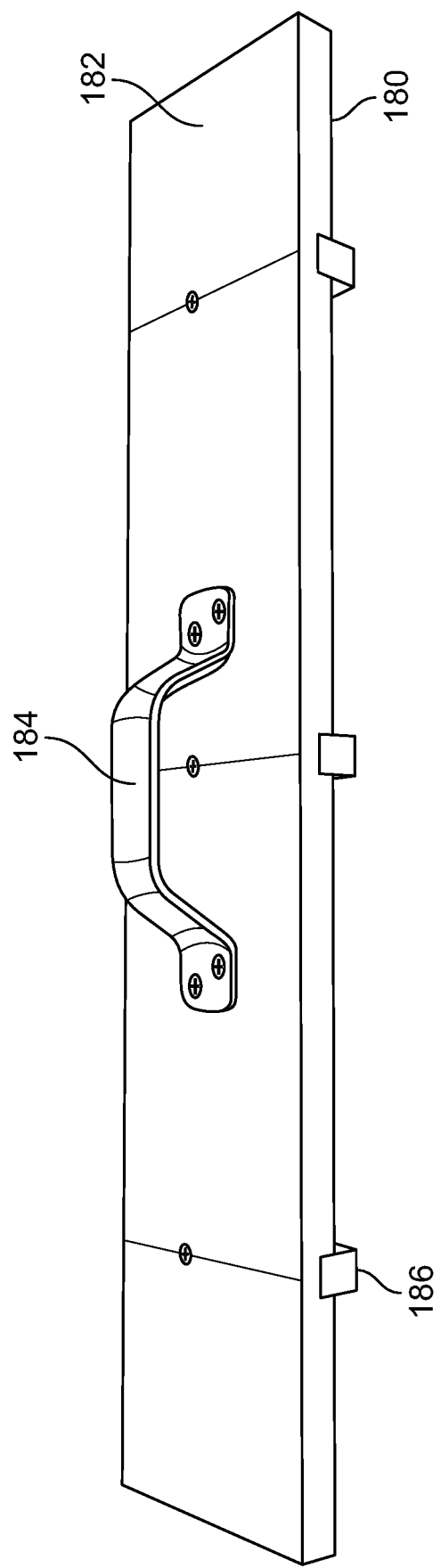
FIG. 18 shows a jig for spacing apart a plurality of blocks according to this disclosure.

FIG. 18 shows a jig for spacing apart a plurality of blocks according to this disclosure. A jig 180 includes an elongated block 182, a handle 184, and a plurality of legs 186. The handle 184 is secured to the block 182, such as via fastening, mating, magnetizing, adhering, or other securing techniques, whether removably or irremovably. The legs 186 are secured to the block 182 via fastening, but other securing techniques, such as mating, magnetizing, adhering, or others, can be used, whether removably or irremovably. At least one of the legs 186 is L-shaped as defined via a stem and a tail, with the block 182 facing the stem and the tail enveloping the block 182 such that the block 182 contacts the tail or against the tail. The legs 186 are spaced apart from each other and extend transversely to the block 182.

The block 182 can include wood, plastic, metal, or other materials. The block 182 is shaped as a cuboid, but other shapes are possible, such as pyramid, trapezoidal prism, a cube, a hemisphere, or others. The block 182 is solid, but can be perforated. The block 182, on any surface, can be longitudinally marked with a graduated scale, such as a ruler, whether grooved thereon or written thereon in a visually or touch distinct manner. The handle 184 can include wood, plastic, metal, or other materials. The handle 184 is U-shaped, but can be shaped differently, such as an L-shape, a V-shape, or others. At least one of the legs 186 can include wood, plastic, metal, or other materials. When at least one of the legs 186 is removably secured, then that leg 186 can be moved along the graduated scale and secured along the graduated scale. The jig 180 can include a level, such as a bubble level or a spirit level, including a multi-liquid container level for various measurements. The level can be secured to or integrated with the block 182, the handle 184, or at least one of the legs 186.

In one mode of operation, the jig 180 is used in a method for establishing a proper spacing of between blocks 114 the tube 112 and the tube engagement unit 100. For example, in context of FIG. 3, the method includes positioning a first block 114a on a surface, such as the subfloor 118, where the first block 114a includes a first ledge 122a and a first wall 124a. The method includes positioning a first leg 186a of a segment, such as the block 182, on the first ledge 122a against the first wall 124a, where the segment includes a second leg 186b. The method includes positioning a second block 114b on the surface, where the second block 114b includes a second ledge 122b and a second wall 124b, where the first wall 124a faces the second wall 124b. The method includes positioning the second leg 186b on the second ledge 122b against the second wall 124b. The method includes securing the second block 114b to the surface. Therefore, the blocks 114a, 114b can be equally spaced.

Although various sizes are illustrated in this disclosure, such sizes are illustrative and can vary based on field conditions. In some embodiments, various functions or acts can take place at a given location and/or in connection with the operation of one or more apparatuses or systems. In some embodiments, a portion of a given function or act can be performed at a first device or location, and a remainder of the function or act can be performed at one or more additional devices or locations.

The corresponding structures, materials, acts, and equivalents of all means or step plus function elements in the claims below are intended to include any structure, material, or act for performing the function in combination with other claimed elements as specifically claimed. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the steps can be performed in a differing order or steps can be added, deleted or modified. All of these variations are considered a part of the disclosure. It will be understood that those skilled in the art, both now and in the future, can make various improvements and enhancements which fall within the scope of the claims which follow.

The description of this disclosure has been presented for purposes of illustration and description, but is not intended to be fully exhaustive and/or limited to the disclosure in the form disclosed. Many modifications and variations in techniques and structures will be apparent to those of ordinary skill in an art without departing from a scope and spirit of this disclosure as set forth in the claims that follow. Accordingly, such modifications and variations are contemplated as being a part of this disclosure. A scope of this disclosure is defined by various claims, which include known equivalents and unforeseeable equivalents at a time of filing of this disclosure.

The invention claimed is:

1. A device comprising:
    a substantially flat, planar, U-shaped plate, comprising a first end having a first distal portion and a first proximal portion, a second end having a second distal portion and a second proximal portion, and a curved portion extending between and directly coupled to the first proximal portion of the first end and the second proximal portion of the second end; and
    a hydronic tube coupled to the U-shaped plate, wherein a length of the hydronic tube extends from the first distal portion of the first end to the second distal portion of the second end, wherein the hydronic tube has substantially similar curvature as the U-shaped plate.

2. The device of claim 1, wherein the U-shaped plate is coupled to the hydronic tube via a heat sink compound.

3. The device of claim 2, wherein the compound includes an adhesive.

4. The device of claim 1, wherein the U-shaped plate is coupled to the hydronic tube via a bracket.

5. A device comprising:
    a substantially flat, planar, U-shaped plate, comprising a first end, a second end, and a curved portion extending between and directly coupled to the first end and the second end; and
    a hydronic tube coupled to the U-shaped plate, wherein the U-shaped plate is coupled to the hydronic tube via a bracket, wherein the bracket is U-shaped, and comprises a first wall extending laterally from the U-shaped plate, a second wall spaced from the first wall and extending laterally from the U-shaped plate, and an arc extending between the first wall and the second wall.

6. The device of claim 1, wherein the U-shaped plate comprises one or more extensions.

7. The device of claim 6, wherein the one or more extensions is configured for coupling to a hydronic tube.

8. The device of claim 6, wherein the one or more extensions is coupled to the hydronic tube.

9. The device of claim 8, wherein the coupling is accomplished via a heat sink compound.

10. The device of claim 1, wherein the U-shaped plate is coupled to a hydronic tube.

11. The device of claim 10, wherein the coupling is accomplished via a heat sink compound.

12. The device of claim 11, wherein the compound includes an adhesive.

13. The device of claim 1, wherein the U-shaped plate is configured for coupling to a hydronic tube.

14. The device of claim 1, wherein the U-shaped plate is configured for coupling to the hydronic tube via a bracket.

15. A device comprising:
    a substantially flat, planar, U-shaped plate, comprising a first end, a second end, and a curved portion extending between and directly coupled to the first end and the second end; and
    a hydronic tube coupled to the U-shaped plate, wherein the U-shaped plate is configured for coupling to the hydronic tube via a bracket, wherein the bracket is U-shaped, and comprises a first wall extending laterally from the U-shaped plate, a second wall spaced from the first wall and extending laterally from the U-shaped plate, and an arc extending between the first wall and the second wall.

16. A method comprising:
    coupling a hydronic tube to a substantially flat, planar, U-shaped plate, wherein the U-shaped plate comprises a first end having a first distal portion and a first proximal portion, a second end having a second distal portion and a second proximal portion, and a curved portion extending between the first proximal portion of the first end and the second proximal portion of the second end, wherein a length of the hydronic tube extends from the first distal portion of the first end to the second distal portion of the second end, wherein the hydronic tube has substantially similar curvature as the U-shaped plate.

17. The method of claim 16, further comprising positioning the hydronic tube in a subflooring.

18. The method of claim 17, wherein an upper portion of the U-shaped plate is flush with a top of the subflooring.

19. The method of claim 16, wherein the U-shaped plate is coupled to the hydronic tube via a heat sink compound.

20. The method of claim 19, wherein the compound includes an adhesive.

21. The method of claim 16, wherein the U-shaped plate is coupled to the hydronic tube via a bracket.

22. A method comprising:
    coupling a hydronic tube to a substantially flat, planar, U-shaped plate, wherein the U-shaped plate comprises a first end, a second end, and a curved portion extending between the first end and the second end, wherein the U-shaped plate is coupled to the hydronic tube via a bracket, and wherein the bracket is U-shaped, and comprises a first wall extending laterally from the U-shaped plate, a second wall spaced from the first wall and extending laterally from the U-shaped plate, and an arc extending between the first wall and the second wall.

23. The method of claim 16, wherein the U-shaped plate comprises one or more extensions.

24. The method of claim 23, wherein the one or more extensions is configured for coupling to a hydronic tube.

25. The method of claim 23, wherein the one or more extensions is coupled to the hydronic tube.

26. The method of claim 25, wherein the coupling is accomplished via a heat sink compound.

27. A device comprising:
    a substantially flat, planar, U-shaped plate, comprising a first end having a first distal portion and a first proximal portion, a second end having a second distal portion and a second proximal portion, and a curved portion extending between the first proximal portion of the first end and the second proximal portion of the second end; and
    at least one leg extending laterally from the U-shaped plate, wherein the at least one leg is configured for coupling to a hydronic tube.

* * * * *